United States Patent
Mobin et al.

(10) Patent No.: US 8,300,684 B2
(45) Date of Patent: *Oct. 30, 2012

(54) REAL-TIME EYE MONITOR FOR STATISTICAL FILTER PARAMETER CALIBRATION

(75) Inventors: Mohammad Mobin, Orefield, PA (US); Ye Liu, San Jose, CA (US); Kenneth Paist, Spring City, PA (US); Mark Trafford, Fleetwood, PA (US)

(73) Assignee: LSI Corporation, Milpitas, CA (US)

( * ) Notice: Subject to any disclaimer, the term of this patent is extended or adjusted under 35 U.S.C. 154(b) by 709 days.

This patent is subject to a terminal disclaimer.

(21) Appl. No.: 12/493,435

(22) Filed: Jun. 29, 2009

(65) Prior Publication Data

US 2010/0329322 A1  Dec. 30, 2010

(51) Int. Cl.
  *H03H 7/40* (2006.01)
(52) U.S. Cl. ......... 375/232; 375/231; 375/350; 708/323
(58) Field of Classification Search .......... 375/229–233, 375/350; 708/300, 301, 305, 322, 323
  See application file for complete search history.

(56) References Cited

U.S. PATENT DOCUMENTS

| 7,656,944 | B2 * | 2/2010 | Franz | 375/233 |
| 7,782,934 | B2 * | 8/2010 | Choi | 375/231 |
| 7,787,536 | B2 * | 8/2010 | Chou | 375/232 |
| 8,074,126 | B1 * | 12/2011 | Qian et al. | 714/704 |
| 8,107,522 | B2 * | 1/2012 | Aziz et al. | 375/233 |

* cited by examiner

*Primary Examiner* — Dac Ha

(57) ABSTRACT

In described embodiments, filter parameters for a filter applied to a signal in, for example, a Serializer/De-serializer (SerDes) receiver and/or transmitter are generated based on real-time monitoring of a data eye. The real-time eye monitor monitors data eye characteristics of the signal present in a data path, the data path applying the filter to the signal. The eye monitor generates eye statistics from the monitored data eye characteristics and an adaptive controller generates a set of parameters for the filter of the data path for statistical calibration of the data eye, wherein the eye monitor continuously monitors the data eye and the adaptive controller continuously generates the set of parameters based on the eye statistics.

18 Claims, 8 Drawing Sheets

```
VERILOG RTL
reg BBPDfrc0, BBPDfrc1, BBPDfrcdis;
always@(negedge RESETN or posedge CLK1del) begin
        if (~RESETN) begin
                BBPDfrc0 <= 0;
                BBPDfrc1 <= 0;
                BBPDfrcdis <= 0;
        end
        else begin
                case ({BBPDOUT, BBPDOUTDEL})
                        2'b11:begin
                                if (~BBPDfrc0) begin
                                        BBPDFRC1 <= ~BBPDfrcdis
                                end
                                else begin
                                        BBPDfrc1 <= 0
                                end
                        end
                        2'b10:begin
                                BBPDfrc0 <= 0;
                                BBPDfrc1 <= 0;
                                BBPDfrcdis <= 0;
                        end
                        2'b01:begin
                                if (~BBPDfrc1) begin
                                        BBPDFRC0 <= ~BBPDfrcdis
                                end
                                else begin
                                        BBPDfrc0 <= 0
                                end
                        end
                        default;
                endcase
        end
End
reg BBPDHYST;
always@( posedge CLK1 or negedge RESETN) begin
        if (~RESETN) begin
                BBPDHYST <= 0;
        end
        elseif (BBPDHYSTENA) begin
                case ({BBPDOUT, BBPDOUTDEL})
                        2'b00 : # 0.2 BBPDHYST <= BBPDfrc1;
                        2'b11 : # 0.2 BBPDHYST <= ~BBPDfrc0;
                        2'b10 : # 0.2 BBPDHYST <= 1;
                        2'b01 : # 0.2 BBPDHYST <= BBPDfrc1;
                        default;
                endcase
        end
        else begin
                # 0.2 BBPDHYST <= BBPDOUT;
        end
End
```

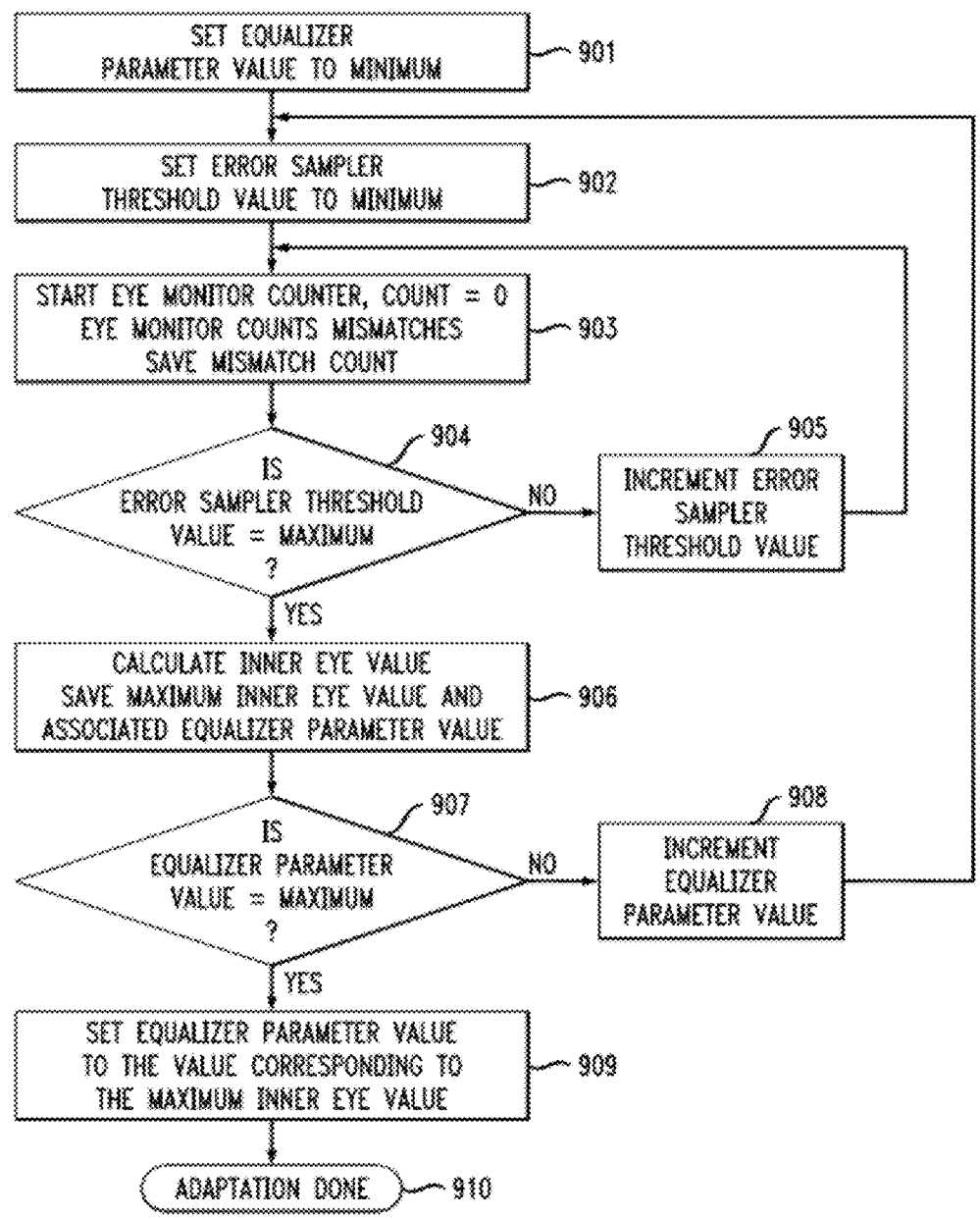

1000

REAL-TIME EYE MONITOR FOR STATISTICAL FILTER PARAMETER CALIBRATION

CROSS-REFERENCE TO RELATED APPLICATIONS

This application related to U.S. application Ser. No. 12/493,513, filed on Jun. 29, 2009, filed concurrently herewith, the teachings of which are incorporated herein by reference.

BACKGROUND OF THE INVENTION

1. Field of the Invention

The present invention relates to data communications, and, in particular, to equalization of a signal through a communications channel.

2. Background of the Invention

In many data communication applications, serializer and de-serializer (SerDes) devices facilitate the transmission between two points of parallel data across a serial link. Data at one point is converted from parallel data to serial data and transmitted through a communications channel to the second point where it received and converted from serial data to parallel data.

At high data rates frequency-dependent signal loss from the communications channel (the signal path between the two end points of a serial link), as well as signal dispersion and distortion, can occur. As such, the communications channel, whether wired, optical, or wireless, acts as a filter and might be modeled in the frequency domain with a transfer function. Correction for frequency dependent losses of the communications channel, and other forms of signal degradation, often require signal equalization at a receiver of the signal. Equalization through use of one or more equalizers compensates for the signal degradation to improve communication quality. Equalization may also be employed at the transmit side to precondition the signal. Equalization, a form of filtering, generally requires some estimate of the transfer function of the channel to set its filter parameters.

In many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. An automatic adaptation process is often employed to adjust the equalizer's response.

In practical implementations of the adaptation processes, variants of least mean square (LMS) adaptation might be used for setting values of equalizer parameter. Values such as, for example, feedback post cursor and feed-forward finite impulse response (FIR) taps in a digital filter, or pole and zero values for an analog filter, equalizer implementation are calculated by optimizing a LMS cost-function based on observation of the received signal over time. Some classical adaptation schemes estimate the channel impulse response by optimizing the minimum mean-squared error cost function between the desired signal, d(n), and the equalized signal, q(n).

After channel estimation, the contributions of inter symbol interference (ISI) due to past detected symbols might be removed from the receiver input signal using Decision Feedback Equalization (DFE). In doing so, the ISI signal spreading is reduced towards an optimal point. In this case, a decision, y(n), is generated and equalized used to provide the desired signal, d(n). Using the LMS adaptation algorithm and sampler array, a receiver calculates a decision error, (n), as in equation (1):

$$\epsilon(n)=d(n)-q(n), \quad (1)$$

and then sets the equalizer parameter values so as to minimize this decision error, $\epsilon(n)$, by optimizing the parameter values under some criterion. Classical adaptive filters minimize the mean square error of $\epsilon(n)$ to achieve the adapted filter parameter values such as, for example, filter tap coefficients of a DFE or pole/zero locations of an analog filter. When optimal filter parameter values are approximately achieved, the derivative of the mean square error with respect to the filter coefficients is zero.

FIG. 1 shows a block diagram of a prior art adaptive equalizer 100. Equalizer 100 comprises DFE 101, sampler array 102, and DFE tap generator 103. Input samples, x(n), are equalized by combination of i) x(n) and ii) decision feedback equalizer error correction signal, e(n), in combiner 110 of DFE 101 to generate an equalized signal, q(n). Sampler array 102 includes top error sampler 111, data sampler 112, and bottom error sampler 113. Top error sampler 111, data sampler 112, and bottom error sampler 113 might be implemented as simple slicers, or as a threshold comparators and latches. The equalized signal, q(n), is sampled by data sampler 112 to generate a decision, y(n), which is also the data output signal.

FIG. 2 shows a data eye diagram 200 overlaid with exemplary data sampler 112 and error samplers 111 and 113. In many practical implementations, the error signal, $\epsilon(n)$, is obtained by placing top error sampler 111 and bottom error sampler 113 at the top eye edge 203 and the bottom eye edge 204 of the data eye. Ideally, the sampler reference voltages of the top error sampler 111 and the bottom error sampler 113 are set at the threshold voltage level that would be achieved after a perfect equalization. Since information of the threshold voltage level that would be achieved for perfect equalization is not known until equalization is applied, an RMS value of the signal is used to estimate the sampler threshold voltage level.

Classical adaptive filters minimize the mean square error of $\epsilon(n)$ to achieve the adapted filter parameter values such as, for example, filter tap coefficients of a DFE or pole/zero locations of an analog filter. When optimal filter parameter values are achieved, the derivative of the mean square error with respect to the filter coefficients will tend to be zero.

SUMMARY OF THE INVENTION

In one embodiment, the present invention allows for generation of filter parameters for a filter applied to a signal in, for example, a Serializer/De-serializer (SerDes) receiver and/or transmitter. A real-time eye monitor monitors data eye characteristics of the signal present in a data path, the data path applying the filter to the signal. The eye monitor generates eye statistics from the monitored data eye characteristics and an adaptive controller generates a set of parameters for the filter of the data path for statistical calibration of the data eye, wherein the eye monitor continuously monitors the data eye and the adaptive controller continuously generates the set of parameters based on the eye statistics.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 shows an exemplary method of DFE tap value adaptation shown by the exemplary embodiment shown in FIG. 4;

FIG. 9 shows an exemplary method of analog equalizer parameter value adaptation shown by the exemplary embodiment shown in FIG. 4;

DETAILED DESCRIPTION

In accordance with exemplary embodiments of the present invention, a system employing, for example, a transmitter, a communication channel, and a receiver, detects and applies correction for signal impairments between the input data stream (transmitter side) and the output data stream (receiver side) through adaptive equalization. Adaptive equalization in accordance with exemplary embodiments of the present invention applies statistically adapted equalization during at least two types of intervals: i) intervals with relatively high allowed error rate with known data pattern characteristics during which the data stream might be corrupted during the adaptation process, such as during training intervals at the beginning of data transfer, and ii) intervals with relatively low allowed error rate with random/unknown data pattern characteristics during which the data stream integrity must be maintained, such as normal data transfer intervals. Such statistically based adaptive equalization employs data eye measurement at the receiver to detect signal impairments and sets parameter values for one or more equalizers to compensate for those signal impairments.

Figure 1:
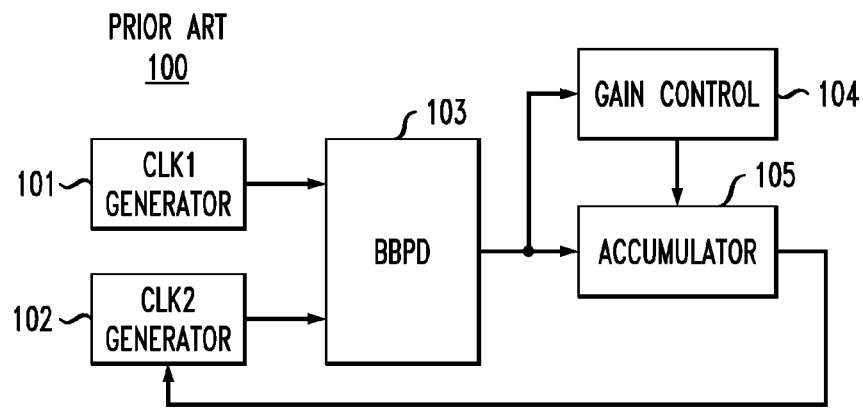
FIG. 1 shows a block diagram of an adaptive equalizer of the prior art.
Figure 2:
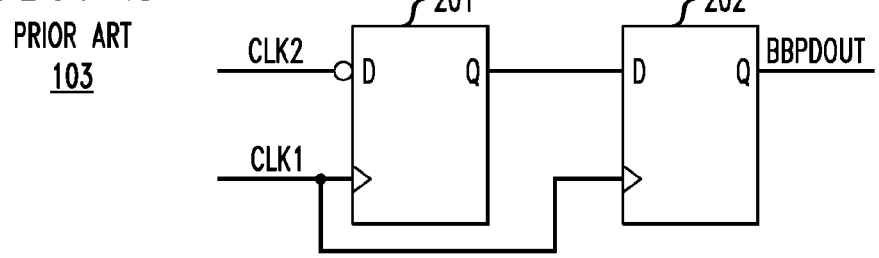
FIG. 2 shows a data eye diagram overlaid with exemplary data and error samplers as might be employed with FIG. 1.
Figure 3:
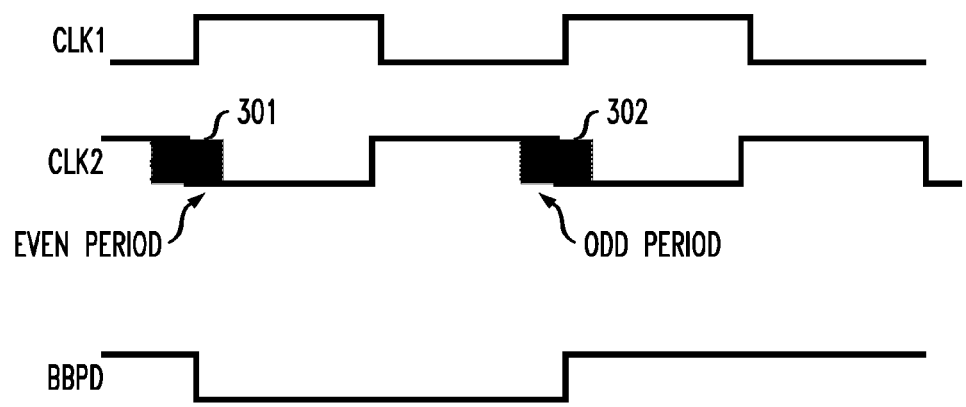
FIG. 3 shows a block diagram of a communications system in accordance with an exemplary embodiment of the present invention.

FIG. 3 shows a block diagram of communication system 300 with statistically adapted equalization operating in accordance with exemplary embodiments of the present invention. System 300 includes transmitter 301 that might optionally include transmit equalizer 309. System 300 transmits a signal from transmitter 301 to receiver 303 through communication channel 302. Channel 302, which might be wired, wireless, optical or some other medium, has an associated transfer function, loss characteristics, and/or other means for adding impairments to the signal passing through it. System 300 further includes receiver 303 having receive equalizer and sampler 307 to correct frequency losses, inter symbol interference (ISI) or other impairments applied to the signal by channel 302. Receiver 303 also includes real-time data eye monitor 304 and statistical adaptation controller 305 (described below in detail). Statistical adaptation controller 305 provides local control signal 306 to set receive equalizer parameter values of receive equalizer 307 and, optionally, back channel control signal 308 to set remote transmit equalizer parameter values of transmit equalizer 309.

Figure 4:
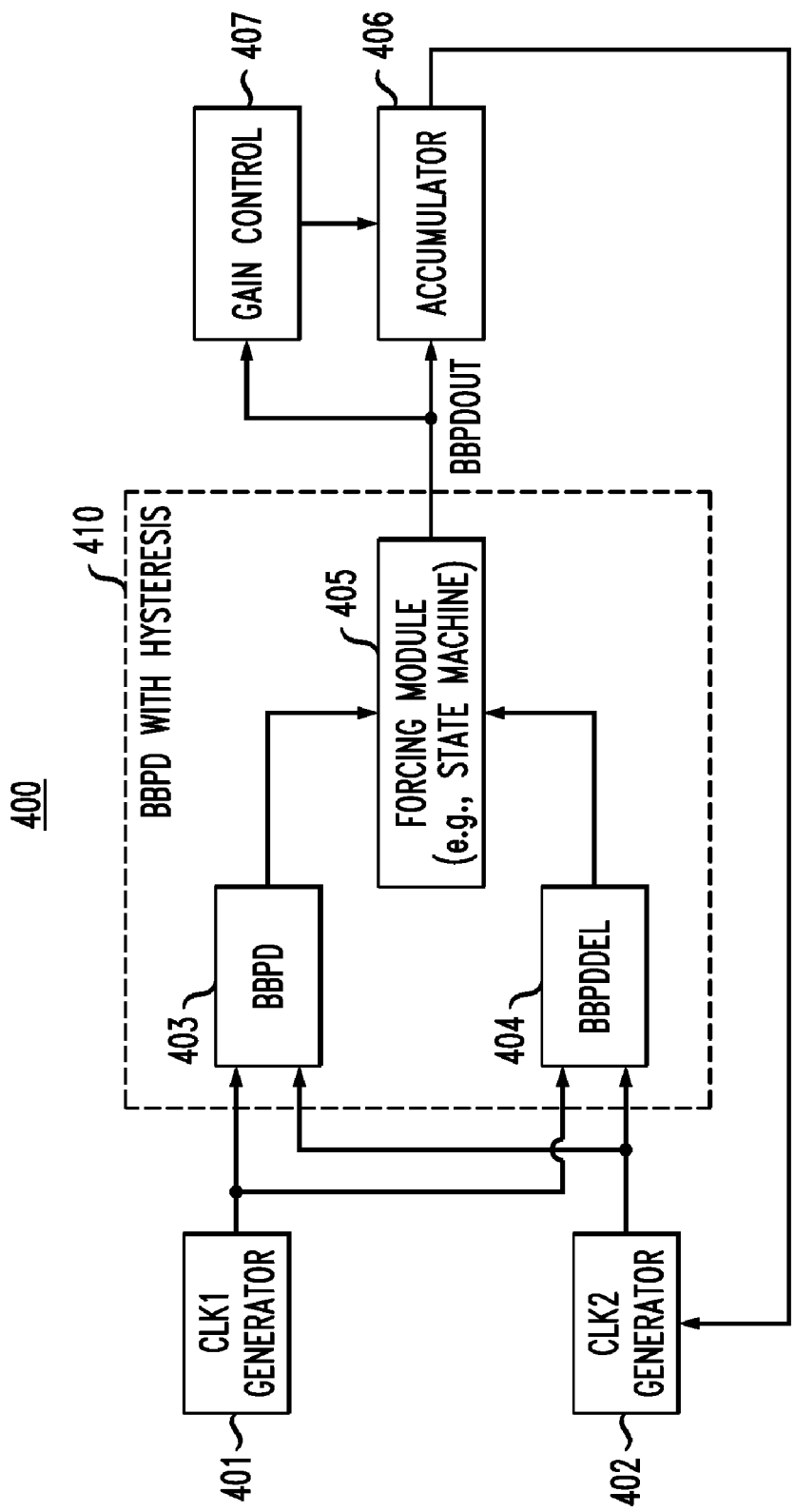
FIG. 4 shows a block diagram of receiver comprised of an analog equalizer and a decision feedback equalizer (DFE) in accordance with an exemplary embodiment of the present invention.

FIG. 4 shows a block diagram of an exemplary embodiment of statistically equalized receiver 307 including analog equalizer 401, decision feedback equalizer (DFE) 402, and sampler array 403. The output signal of sampler array 403 is provided to eye monitor 304. Statistical adaptation controller 305 controls sampler array 403 parameter values and controls eye monitor 304 parameter values and functions. Statistical data or eye statistics from eye monitor 304 are fed back to statistical adaptation controller 305. Analog equalizer 401 processes the input signal and passes the resulting signal to DFE 402 for further processing such as, for example, correction of impairments added to the input signal by the channel. Some embodiments might use only one analog equalizer or one DFE, while other embodiments might employ both. The processed signal from DFE 402 is applied to the input of sampler array 403, which digitizes (samples and quantizes) the signal in time and amplitude. Sampler array 403 might be employed in a manner known in the art of clock-data recovery (CDR) to digitize a data stream. Eye monitor 304 accumulates statistics from the digitized signal. Statistical adaptation controller 305 includes one or more equalizer adaptation modules such as, for example, statistical DFE adaptation module 406 and statistical analog equalizer adaptation module 407 employed to set the statistical parameters of eye monitor 304 and collect a set of eye statistics that are processed by algorithms, described subsequently, employed to set parameter values of analog equalizer 401, DFE 402, or both analog equalizer 401 and DFE 402.

Eye statistics are measured data sets that are evaluated to determine inner eye height corresponding with amplitude, or inner eye width corresponding with time, or both inner eye height and width. Eye statistics might include, for example, mismatch counts of a data sampler output value and an error sampler output value accumulated within a time interval. Statistical parameters for each datum might include, for example, the duration of the time interval over which the mismatch count was accumulated, the amplitude threshold of the error sampler, and the phase of the error sampler clock.

Statistical adaptation controller 305 also includes at least one adaptation module, such as, for example, statistical analog equalizer adaptation module 407 and a statistical DFE adaptation module 406. Statistical analog equalizer adaptation module 407 searches and sets filter parameters for analog equalizer 401 providing the relatively largest inner data eye, as evidenced from eye statistics from eye monitor 304. Statistical DFE adaptation module 406 searches and sets DFE filter tap values for DFE 402, on a tap-by-tap basis, which provide the relatively largest inner data eye, as evidenced from eye statistics from eye monitor 304.

Figure 5:
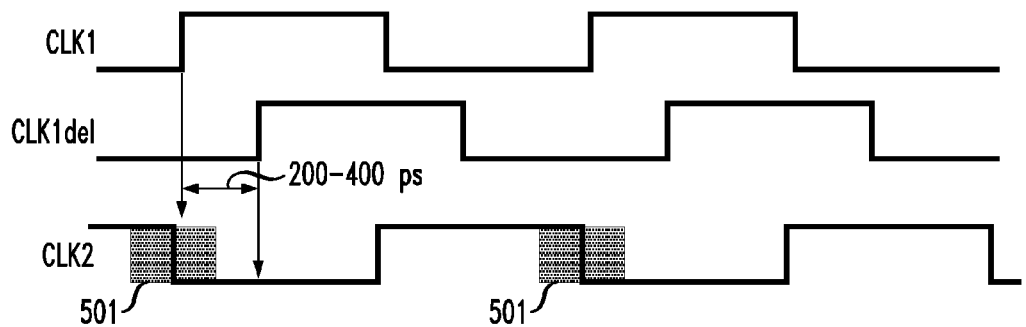
FIG. 5 shows an eye monitor for vertical eye height measurement as might be employed in the eye monitor of FIG. 3.

FIG. 5 shows statistical eye detector 500 as might be employed by eye monitors 304. Statistical eye detector 500 monitors a vertical eye opening by comparing the digitized values of data sampler 502 with the digitized values of variable threshold samplers TES (top error sampler) 503A and BES (bottom error sampler) 503B using comparators 504A and 504B, respectively (shown implemented as XOR logic in FIG. 5). While sampler array 403 is shown with three samplers 503A, 503B, and 502, other embodiments might employ additional or fewer samplers to digitize the signal. Compare selector 505 selects output of one of comparators 503A or 503B depending on the output value of data sampler 502 for its output. If data sampler 502 produces a digitized value of logic "1", the output of comparator 504A is provided from compare selector 505. Otherwise, if data sampler 502 produces a digitized value of logic "0", the output of comparator 504B is provided from compare selector 505. Mismatch counter 506 increments for each mismatch of data sampler 502 and selected one of variable threshold samplers TES 503A and BES 503B. Mismatch counter 506 operates as long as eye detector state machine 507 enables mismatch counter 506.

Figure 6:
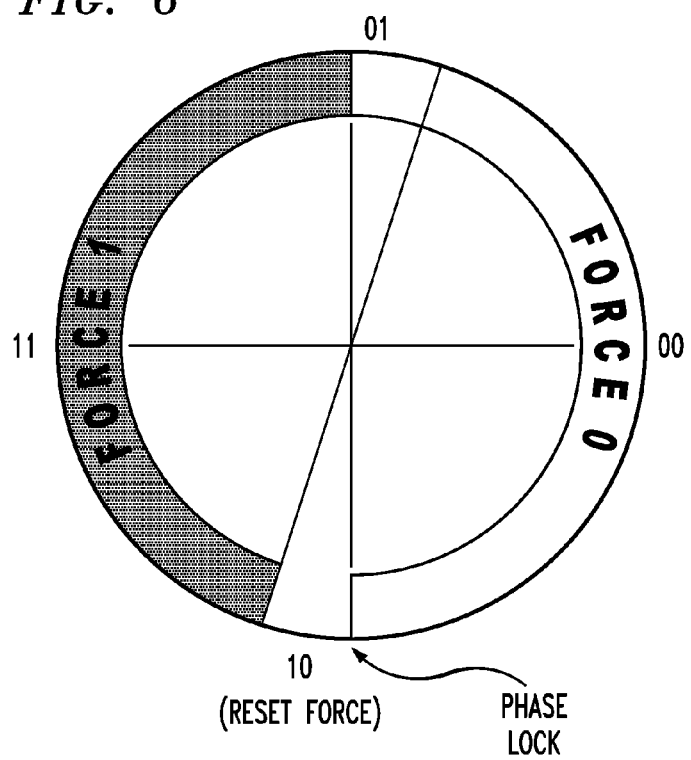
FIG. 6 shows exemplary data eye diagrams as they might appear before and after receiver equalization.
Figure 7A:
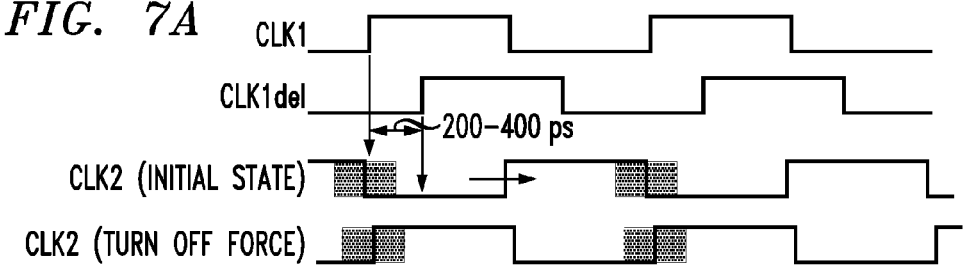
FIG. 7 shows an eye monitor for horizontal eye width measurement as might be employed in the eye monitor of FIG. 3.
Figure 7B:
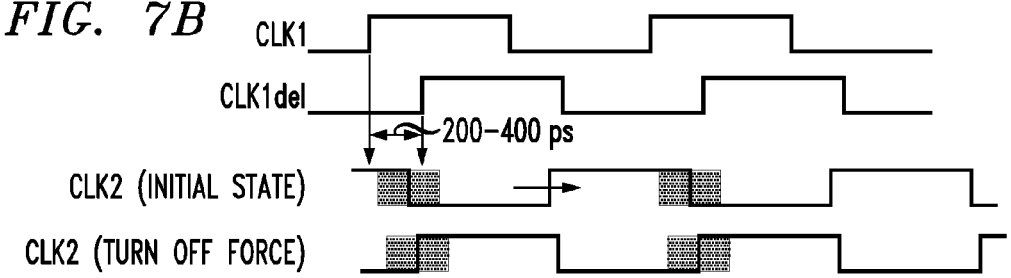
Figure 7C:
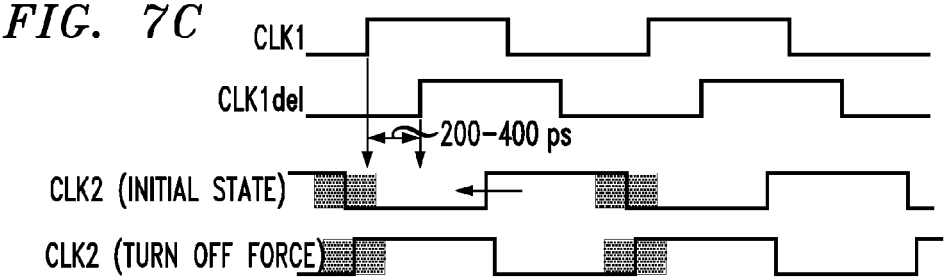
Figure 7D:
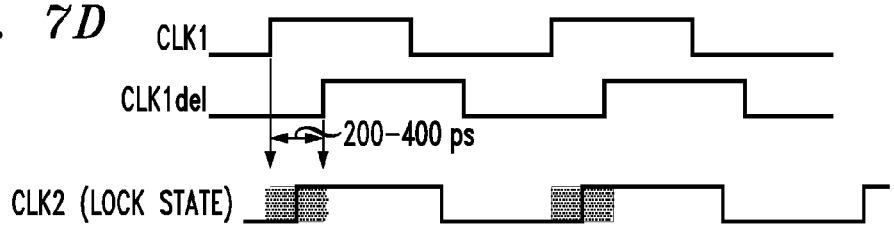

FIG. 6 shows a data eye transition diagram 600 to illustrate operation of eye monitor 500 of FIG. 5. Integrity of high-speed data recovery might be analyzed in terms of an eye diagram, such as input eye diagram 601 or output eye diagram 603, as shown in FIG. 6, where traces of received signal waveforms are overlaid on top of each other in one or more unit intervals (UIs). The eye diagram has a vertical direction (Y-axis) in, for example, millivolts (mV) corresponding to signal amplitude and sampler threshold, and a horizontal direction (X-axis) in, for example, picoseconds (ps) corresponding to time within the overlaid data sample. The shape of the eye is dependent on the characteristics of the original signal from the transmitter, the impairments to the signal as it passes through the communication channel and the signal processing applied to the signal by the receiver.

Initially, an eye diagram for input data might show a data eye with no signal, close to the center of the eye either vertically or horizontally. In this case, little or no change to equalizer settings might be required. On the other hand, an eye diagram, such as shown as eye diagram 601, might show a data eye with signal close to or even going through the center of the eye. In this case, equalizer settings of receive equalizer 307 might be adjusted to correct impairments to the signal and reduce the potential of data errors in the output data stream. When equalizer settings of receive equalizer 307 are adjusted, an improved eye diagram results, shown as eye diagram 603. In both cases, maximizing the eye opening in both the vertical and horizontal directions reduces the potential for errors in the output data stream.

The received symbols at the input to the data sampler (implemented, for example, as a slicer) is represented as given in equation (2):

$$y(n)=D*[H_T*H_C*W] \qquad (2)$$

where $H_T$, $H_C$ and W are the transmitter, channel, and receive filter impulse responses, respectively, and D represents the transmitted bit symbols. When a perfect equalization is achieved the composite impulse response approaches 1, as represented in equation (3):

$$h=H_T*H_C*W \to 1 \qquad (3)$$

If the discrete channel taps are denoted as h(i), i=1 ... N, the absolute value of the ISI, x(n), generated by an non-return to zero (NRZ) modulated symbol, s(n), is bounded by the following two equations (4) and (5):

$$x(n)_{OuterEYE} = |s(n)| + \sum_{i=1}^{N} |s(n-i)| \times |h(i)| \qquad (4)$$

$$x(n)_{InnerEYE} = |s(n)| - \sum_{i=1}^{N} |s(n-i)| \times |h(i)| \qquad (5)$$

The objective of equalization algorithms is to eliminate or reduce the ISI components on current symbol, where absolute ISI is given as in equation (6):

$$ISI\ Components = \sum_{i=1}^{N} |s(n-i)| \times |h(i)| \qquad (6)$$

Reduction of ISI components or other channel induced impairments is achieved by maximizing the inner eye, shown as $E[V_{EYE}]$ 604 in FIG. 6, in both long channel and short channel cases. Consequently, statistical adaptation might be applied to equalizers such as, for instance, DFE 402 and analog (or other continuous time) equalizer 401. statistical adaptation might also be applied to transmitter equalization, as described below. Optimized equalization increases the vertical opening of the inner eye. If signal is not optimally equalized, the outer eye might move down toward an optimal level (termed an "under-equalized" signal) or the outer eye might move below the optimal level (termed an "over-equalized" signal). Similarly the inner eye might be over-equalized (move above the optimal signal level) or under-equalized (stay below the optimal signal level). Thus, eye height is a good indicator of adaptation success. Statistical adaptive equalization algorithms optimize the inner eye height to achieve the equalization objectives.

A set of eye statistics for measuring eye height might include, for example, a set of mismatch count values with error samplers 503A and 503B having compare threshold levels set at increments above and increments below the compare threshold of data sampler 502. (The time for accumulating each mismatch count is generally, the same, and only the thresholds of the error samplers change.) Within the inner eye, the mismatch count value is generally zero, and outside the inner eye the mismatch count value is generally non-zero. However, a matching threshold other than zero might be employed to identify a match or a mismatch. With a matching threshold applied, the eye height might be determined by employing a scan algorithm that searches for inner eye edges identified by match/mismatch transitions in the eye statistics data set. The number of increments between mismatch/match transitions represents the inner eye height, $E[V_{EYE}]$.

Another indicator of adaptation success is horizontal eye opening. FIG. 7 shows circuit 700 as might be employed in statistical eye monitor 302 to measure horizontal eye opening. A sampler array employs data sampler 701 and error sampler 702 having reference threshold set to zero (or otherwise to the same threshold as data sampler 701). The clock phase adjustor 703 positions error sampler 702 in time within the UI. The clock phase position for data sampler 701 is generally fixed in the middle of the UI. The outputs of data sampler 701 and error sampler 702 are compared by comparator (XOR) 704. The output of comparator 704 might enable the incrementing of counter 705 over a variable time interval, such as, for example, a window of 64 UI to $2^N$UI width (where $2^N$ is a large number), which interval is controlled through state machine 706 (count start and count stop).

A set of eye statistics for measuring eye width might include, for example, a set of mismatch count values with error sampler 702 having clock phase settings at increments before and increments after the clock phase of data sampler 701. (The time for accumulating each mismatch count may be the same with only the error sampler clock phase changing.) Within the inner eye, the mismatch count value is generally zero, and outside the inner eye the mismatch count value is generally non-zero. However, a matching threshold other than zero might be employed to identify a match or a mismatch. With a matching threshold applied, the eye width might be determined by employing a scan algorithm that searches for inner eye edges identified by match/mismatch transitions in the eye statistics data set. The number of increments between mismatch/match transitions represents the inner eye width.

Techniques for monitoring a data eye in a CDR system, while the CDR system is operating (i.e., "on-line"), are described in U.S. Patent Publication 2006-0222123 A1 (U.S. application Ser. No. 11/095,178), filed on Mar. 31, 2005 and having a common assignee with the assignee of this application. The disclosure of U.S. Patent Publication 2006-0222123 A1 (Ser. No. 11/095,178) is incorporated in its entirety herein by reference. Eye monitor 304 of FIG. 3 employs, for example, the techniques described in the disclosure of Ser. No. 11/095,178 to provide measurements of the data eye seen at the input to eye monitor 304.

Operation of receiver statistical DFE adaptation module 406 is now described with respect to FIG. 8. FIG. 8 shows exemplary method 800 of receiver statistical adaptation employed by the exemplary embodiment shown in FIG. 4. Although exemplary method 800 is described below using sequential scanning of DFE taps, DFE tap coefficient values, and eye values, other scanning sequences may be employed.

At step 801, serial data is present at the input of the receiver and a protocol level function causes adaptation to start with selection of the first DFE tap, such as, for example h(1), to be initialized for scanning and adaptation. Step 802 starts the DFE tap adaptation loop by setting the first tap coefficient value h(n) to, for example, the minimum coefficient value $h(n)_{MN}$, of the selected DFE tap. At step 803, the initial error sampler array thresholds are set to minimum values.

At step 804, eye monitor 304 accumulates an eye statistic. At step 805, a test determines whether eye statistics for all threshold value settings have been taken. If the test of step 805 determines eye statistics for all threshold value settings have not been taken, the next sampler threshold value is set at step 806, and the method returns to step 804. If the test of step 805 determines eye statistics for all threshold value settings have been taken, this set of statistics is scanned to find inner eye opening, $E[V_{EYE}]$ at step 807.

At step 808, a test determines whether all DFE tap value settings have been evaluated. If the test of step 808 determines all DFE tap value settings have not been evaluated, the next DFE tap value is set at step 809 and the method returns to step 803 to repeat the inner eye evaluation process. Otherwise, if the test of step 808 determines all DFE tap value settings have been evaluated, at step 810 the DFE selected tap value is set to the value that resulted in the maximum inner eye opening.

The process of adapting one DFE tap value at a time is repeated until each DFE tap value has been set. At step 811, a test determines whether all DFE taps have been adapted. If the test of step 811 determines all DFE taps have not been adapted, the method advances to step 812 to select the next DFE tap. The method then returns to step 802 to repeat the single DFE tap value adaptation process. If the test of step 811 determines all DFE tap values have been set, a single pass of DFE adaptation is complete and the method ends. Some applications might employ multiple passes of DFE adaptation.

Operation of receiver statistical analog equalizer adaptation module 407 is now described with respect to FIG. 9, where FIG. 9 shows an exemplary method 900 of receiver statistical adaptation employed by the exemplary embodiment shown in FIG. 4. Although the exemplary method 900 described below employs sequential scanning of analog equalizer parameter values and eye values, other scanning sequences may be employed. Although the exemplary method 900 described below employs control of a single dimension parameter value, other multiple dimension parameter value controls may be employed.

At step 901, serial data is present at the input of the receiver and a protocol level function causes adaptation to start by setting the first analog equalizer parameter value, such as, for example, the minimum value. At step 902, the error sampler thresholds are set to minimum values.

At step 903, eye monitor 304 accumulates an eye statistic. At step 904, a test determines whether eye statistics for all threshold value settings have been taken. If the test of step 904 determines eye statistics for all threshold value settings have not been taken, the next sampler threshold value is set at step 905, and the method returns to step 903. If the test of step 904 determines eye statistics for all threshold value settings have been taken, this set of statistics is scanned to find inner eye opening, $E[V_{EYE}]$ at step 906 for the analog equalizer parameter value setting when step 902 is entered.

At step 907, a test determines whether all analog equalizer parameter value settings have been evaluated. If the test of step 907 determines all analog equalizer parameter value settings have not been evaluated, the next analog equalizer parameter value is set at step 908 and the method returns to step 902 to repeat the inner eye evaluation process. Otherwise, if the test of step 907 determines all analog equalizer parameter value settings have been evaluated, at step 909 the analog equalizer parameter value is set to the value that resulted in the maximum inner eye opening, a single pass of analog equalizer adaptation is complete, and the method ends. Some applications might employ multiple passes of analog equalizer adaptation.

Figure 10:
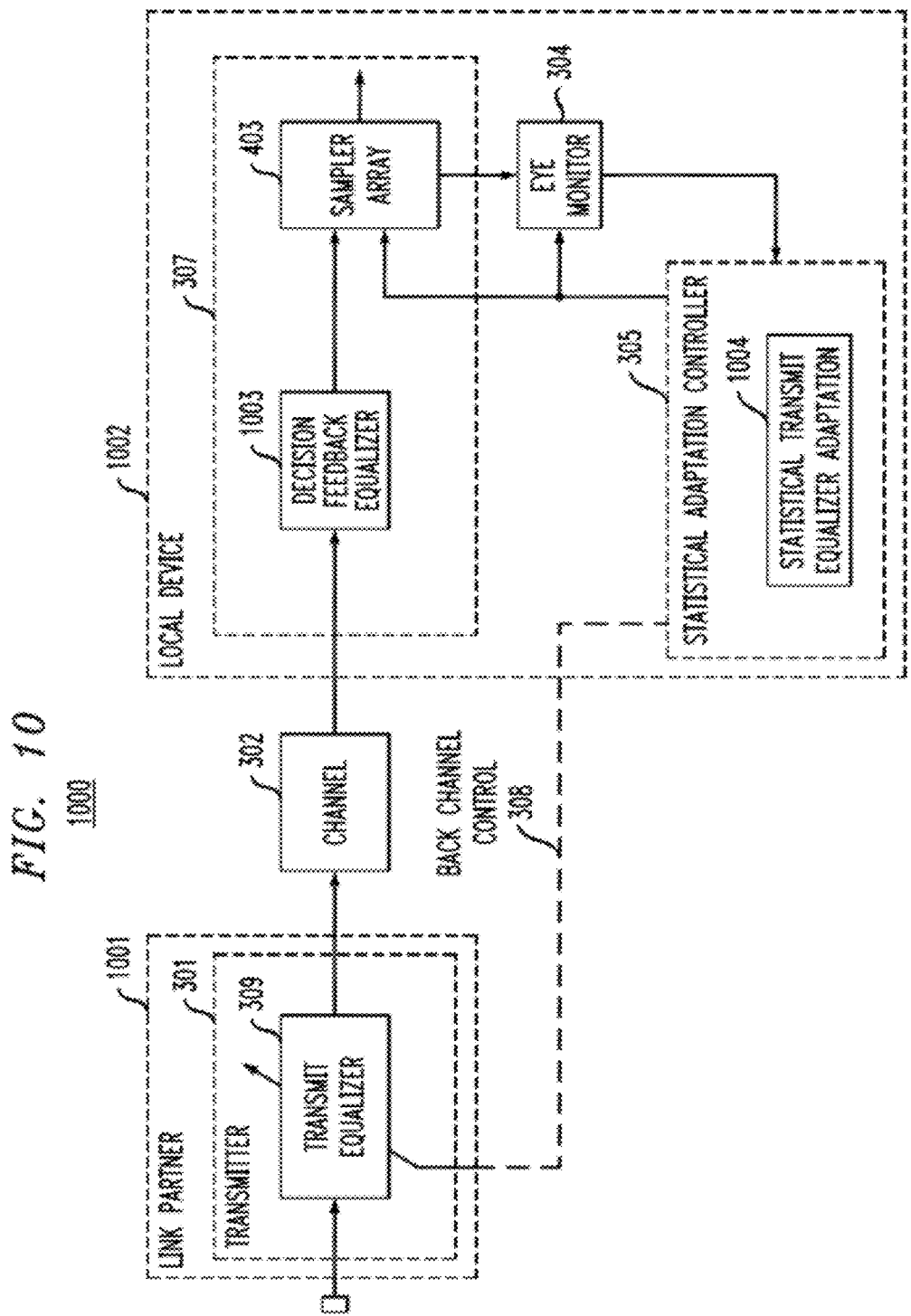
FIG. 10 shows a block diagram of a back channel control of a transmit equalizer employing statistical adaptation in accordance with an exemplary embodiment of the present invention.

As described above, statistical adaptation might be applied to transmitter equalization as well as receiver equalization. FIG. 10 shows a block diagram of an exemplary embodiment of a statistically equalized transmitter with local device 1002 and link partner 1001 coupled to like-numbered elements as described with respect to FIGS. 3 and 4. Statistically equalized transmitter 301 comprises transmit filter 309, communication channel 302, receiver equalizer 1003, sampler array 403, eye monitor 304, statistical adaptation controller 305 having transmit equalizer adaptation module 1004, and back channel control 308. Transmitter 301 might include transmit equalizer 309 such as, for example, an FIR filter with adjustable tap coefficient values. Transmit equalizer 309 pre-equalizes the transmitted signal that passes through communication channel 302 which is input to receive equalizer 1003. The resulting signal from receive equalizer 1003 is digitized by sampler array 403 for down stream data processing and for data eye statistics gathering by eye monitor 304. Statistical adaptation controller 305 sets the statistical parameter values, collects the statistics from eye monitor 304, and sets the parameter values of transmit equalizer 309 through a signal provided through back channel control 308. Receiver equalizer 1003, sampler array 403, eye monitor 304, and statistical adaptation controller 305 operate in a manner analogous to that described above with respect to like elements of receiver 303 of FIG. 3.

Figure 11:
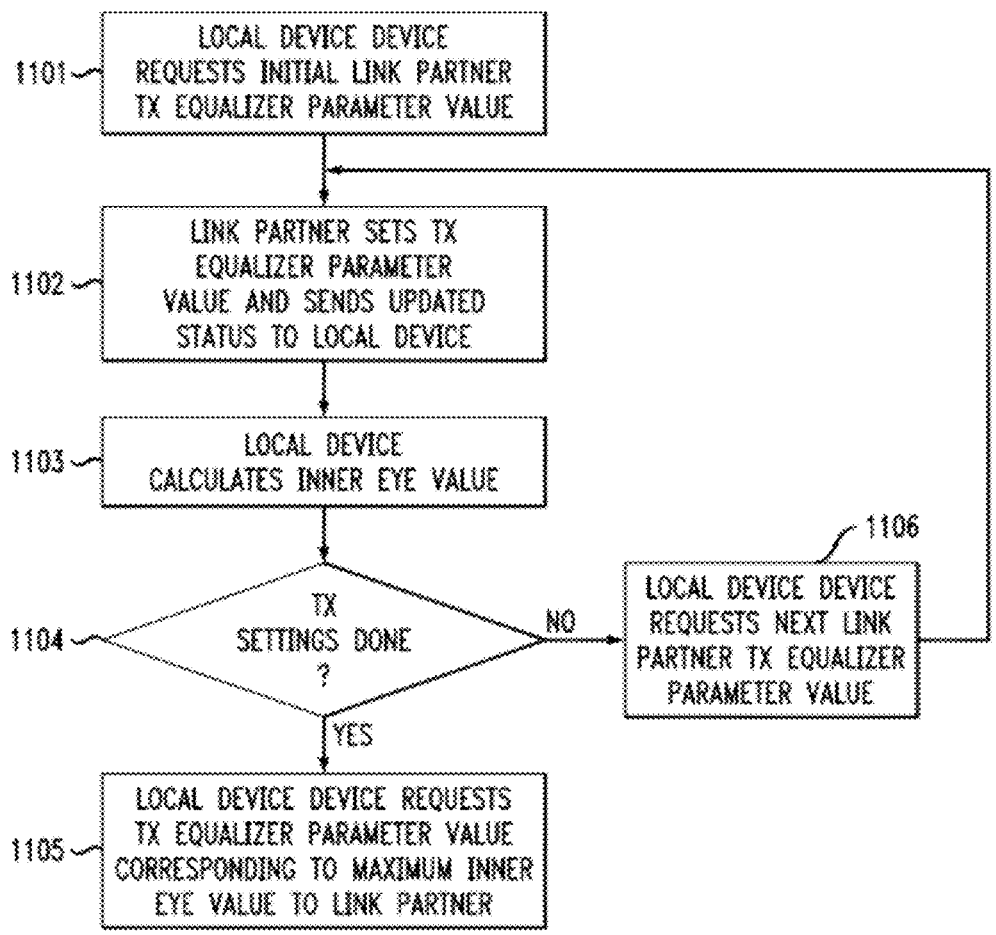
FIG. 11 shows an exemplary method of transmit equalizer parameter value adaptation shown by the exemplary embodiment shown in FIG. 10.

Operation of statistically-equalized transmitter 301 is now described with respect to FIG. 11, where FIG. 11 shows an exemplary method 1100 of transmit equalizer statistical adaptation employed by the exemplary embodiment shown in FIG. 10. Although the exemplary method described herein uses sequential scanning of transmit equalizer parameter values and eye values, other scanning sequences may be employed.

Step 1101 initializes the transmit equalizer adaptation loop by local device 1002 requesting link partner 1001 to set the first equalizer parameter value, such as, for example, the minimum value.

At step 1102, link partner 1001 responds by setting the transmit equalizer parameter value, sending a data stream, such as, for example a training pattern with known characteristics, and acknowledging the request to local device 1002.

At step 1103, a set of eye statistics is accumulated for all error sampler threshold values of sampler array 403 using eye monitor 304. This set of statistics is scanned to find inner eye opening, $E[V_{EYE}]$ by local device 1002.

At step 1104, a test determines whether all transmit equalizer parameter value settings have been evaluated. If the test of step 1104 determines that all transmit equalizer parameter value settings have not been evaluated, local device 1002 requests link partner 1001 to set the next transmit equalizer parameter value, and then the method returns to step 1102. Otherwise, if the test of step 1104 determines that all transmit equalizer parameter value settings have been evaluated, at step 1105, a request is sent to link partner 1001 to set the transmit equalizer parameter value to the one that resulted in the maximum inner eye opening, completing a single pass of transmit equalizer adaptation, and the method ends. Some embodiments might employ multiple passes of transmit equalizer adaptation.

Further embodiments might include adjustable data sampler threshold and adjustable data sampler clock phase. The addition of data sampler adjustments would employ the same methods described earlier with additional scanning loops. For example, if adjustable data sampler threshold was included, a loop around one or more of the statistical adaptation control methods (statistical DFE adaptation method 800, statistical analog equalizer adaptation method 900, and statistical transmit equalizer adaptation method 1100) might be added to search for the optimum equalizer setting and data sampler threshold combination. Similarly, if any combination of adjustable data sampler threshold and adjustable data sampler clock phase was included, additional loops might be added to search for the optimum equalizer setting, data sampler threshold and data sampler clock phase combination.

A system employing one or more embodiments of the present invention might allow for the following advantages. Statistical adaptation achieves equalizer optimization quickly with little dedicated hardware. An eye monitor can collect statistics for every symbol in the data stream in real time. An embodiment might evaluate some eye statistics while other eye statistics are being collected thus effectively limiting adaptation time to the time it takes to collect eye statistics. The same basic hardware supports statistical adaptation of at least three types of equalizer (analog receive equalizer, receive DFE and transmit equalizer). The statistical adaptation for group delay optimization of group delay employs much of the same apparatus as vertical eye optimization with the addition of variable clock phase control for the error sampler. Thus joint optimization of vertical and horizontal eye opening is achievable and has the advantage of increased flexibility to choosing different optimization criteria without increasing number of error latches other complexities. In the case of DFE tap optimization, statistical adaptation is not susceptible to local minimum problems due to the fact that every tap choice is evaluated and a global minimum is found. Consequently, the system might exhibit improved data detection, lower bit error rate, faster initialization performance, and improved timing extraction performance.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

It will be further understood that various changes in the details, materials, and arrangements of the parts which have been described and illustrated in order to explain the nature of this invention may be made by those skilled in the art without departing from the scope of the invention as expressed in the following claims.

We claim:

1. Apparatus for generating filter parameters for a filter applied to a signal, the apparatus comprising:
  a real-time eye monitor configured to i) monitor data eye characteristics of the signal present in a data path, the data path applying the filter to the signal, and ii) generate eye statistics from the monitored data eye characteristics, the eye monitor monitoring the data with a sampler array comprising a top sampler, a data sampler, and a bottom sampler;

an adaptive controller configured to generate a set of parameters for the filter of the data path for statistical calibration of the data eye;

wherein the eye monitor continuously monitors the data eye and the adaptive controller continuously generates the set of parameters based on the eye statistics, wherein one of the eye characteristics includes an error in vertical height of the data eye based on a sampled top edge, a sampled bottom edge, and a sampled data value at a center of the data eye, and wherein the apparatus further comprises a voltage threshold controller configured to set the sampling level of the top sampler, the data sampler, and the bottom sampler in response to the adaptive controller.

2. The invention of claim 1, wherein the eye characteristics is a change in at least one of an eye amplitude, an eye width, and a data transition.

3. The invention of claim 2, further comprising an interval controller, wherein the generated eye statistics includes a set of mismatch count values over a time interval set by the interval controller for at least one of the eye amplitude, the eye width, and the data transition.

4. The invention of claim 1, wherein the filter is at least one of an analog transmitter equalizer, a finite impulse response (FIR) transmit equalizer, a receiver front end analog equalizer, and a decision feedback equalizer (DFE).

5. The invention of claim 1, wherein:
the top sampler of the array samples a top edge of the data eye,
the data sampler of the array samples a data value at the center of the data eye, and
the bottom sampler of the array samples a bottom edge of the data eye.

6. The invention of claim 5, wherein the data sampler comprises a first width sampler and a second width sampler measuring a relative change in width of the data eye as one of the eye characteristics, and the apparatus further comprises a phase controller configured to adjust a clock phase of at least one of the first width sampler and the second width sampler of the sampler array based on the relative error in width of the data eye.

7. The invention of claim 1, further comprising a comparator, an interval controller, and a counter, wherein:
the comparator is configured to compare the sampled top edge and the sampled bottom edge to provide an output mismatch, and the counter is configured to increment over a time interval based on each monitored mismatch for at least one of the eye amplitude, the eye width, and the data transition, wherein the generated eye statistics includes the mismatch count values over a time interval set by the interval controller.

8. The invention of claim 1, wherein the apparatus is embodied in an integrated circuit.

9. A method of generating filter parameters of a filter applied to a signal, the method comprising the steps of:
a) monitoring, with a real-time eye monitor with a sampler array, data eye characteristics of the filtered signal present in a data path, and generating as one of the eye characteristics, an error in vertical height of the data eye based on a sampled top edge, a sampled bottom edge, and a sampled data value at a center of the data eye;
b) continuously generating eye statistics from the monitored data eye characteristics; and
c) generating sets of parameters for the filter of the data path based on the eye statistics for statistical calibration of the data eye.

10. The invention of claim 9, wherein, for step a), the monitored change in the eye characteristics is a change in at least one of an eye amplitude, an eye width, and a data transition.

11. The invention of claim 10, wherein, for step b), the generated set of eye statistics for measuring eye width includes a set of mismatch count values for at least one the eye amplitude, the eye width, and the data transition.

12. The invention of claim 10, wherein step c0 comprises the step of initializing the filter by the steps of
c1) initializing one or more filter parameters to a corresponding initial value;
c2) monitoring at least one of an eye height and an eye width of the data eye;
c3) updating the one or more filter parameters to a next available value based on step c2);
c4) scanning a range of the one or more filter parameters by repeating steps c2) and c3) over the range; and
c5) selecting the values of the one or more filter parameters of the range for the equalizer with a relative optimum eye height and an eye width of the data eye.

13. The invention of claim 9, wherein, for step c), the filter is at least one of an analog transmit equalizer, a finite impulse response (FIR) transmit equalizer, a receive front end analog equalizer, and a decision feedback equalizer (DFE).

14. The invention of claim 9, wherein step a) comprises the steps of a1) sampling, with a top sampler of the array, a top edge of the data eye, a2) sampling, with a data sampler of the array, a data value at the center of the data eye, and a3) sampling, with a bottom sampler of the array, a bottom edge of the data eye.

15. The invention of claim 14, wherein, for step a), the data sampler comprises a first width sampler and a second width sampler measuring a relative error in width of the data eye as one of the eye characteristics, and the method further comprises the step of adjusting a clock phase of each sampler based on the relative error in width of the data eye.

16. The invention of claim 9, further comprising the steps of:
generating a time interval with an interval controller;
comparing the sampled top edge and the sampled bottom edge;
providing an output mismatch based on the comparison; and
incrementing a counter over a time interval based on each provided mismatch for at least one of the eye amplitude, the eye width, and the data transition, wherein the generated eye statistics includes the mismatch count values over the time interval.

17. The invention of claim 9, wherein the method is implemented as steps in a serializer/deserializer (SERDES) device.

18. A machine-readable medium, having encoded thereon program code, wherein, when the program code is executed by a machine, the machine implements a method for generating filter parameters of a filter applied to a signal representing serial data, comprising the steps of:
a) monitoring, with a real-time eye monitor with a sampler array, data eye characteristics of the filtered signal present in a data path, and generating as one of the eye characteristics, an error in vertical height of the data eye based on a sampled top edge, a sampled bottom edge, and a sampled data value at a center of the data eye;
b) continuously generating eye statistics from the monitored data eye characteristics; and
c) generating sets of parameters for the filter of the data path based on the eye statistics for statistical calibration of the data eye.

* * * * *